US006654334B1

(12) United States Patent
Yamashita et al.

(10) Patent No.: US 6,654,334 B1
(45) Date of Patent: Nov. 25, 2003

(54) DISK LOADING DEVICE HAVING A MANUAL DRIVE MEMBER FOR MOVING A DRIVE MECHANISM IN AN EJECT DIRECTION

(75) Inventors: Norio Yamashita, Tokorozawa (JP); Mitsunobu Sato, Tokorozawa (JP); Ryou Yoshitomi, Higashiosaka (JP)

(73) Assignee: Teac Corporation, Tokyo (JP)

( * ) Notice: Subject to any disclaimer, the term of this patent is extended or adjusted under 35 U.S.C. 154(b) by 89 days.

(21) Appl. No.: 09/724,104

(22) Filed: Nov. 28, 2000

(30) Foreign Application Priority Data

Dec. 3, 1999 (JP) .............................................. 11-345507
Oct. 24, 2000 (JP) ......................................... 2000-324398
Nov. 24, 2000 (JP) ......................................... 2000-358388

(51) Int. Cl.$^7$ .............................................. G11B 17/04
(52) U.S. Cl. ....................................................... 369/77.1
(58) Field of Search ........................... 369/77.1; 360/97, 360/105

(56) References Cited

U.S. PATENT DOCUMENTS

| | | | | | |
|---|---|---|---|---|---|
| 4,979,160 A | * | 12/1990 | Araki | ......................... | 369/77.1 |
| 5,126,899 A | * | 6/1992 | Kanazawa | ................... | 369/77.2 |
| 5,255,255 A | * | 10/1993 | Kaneda et al. | ............. | 369/77.1 |
| 5,297,117 A | * | 3/1994 | Uzuki et al. | ............... | 369/77.2 |
| 5,691,969 A | * | 11/1997 | Fujisawa | .................... | 369/77.1 |
| 6,058,090 A | * | 5/2000 | Wang et al. | ............... | 369/77.1 |
| 6,111,838 A | * | 8/2000 | Akiba | ........................ | 369/77.1 |

FOREIGN PATENT DOCUMENTS

| JP | 03-286467 | * | 12/1991 | ........... G11B/17/04 |
|---|---|---|---|---|
| JP | 08-102120 | * | 4/1996 | ........... G11B/14/04 |

OTHER PUBLICATIONS

Tsuneo et al. JP 08–102120 machine translation. Apr. 1996.*

* cited by examiner

Primary Examiner—George J. Letscher
Assistant Examiner—Christopher R. Beacham
(74) Attorney, Agent, or Firm—Anderson Kill & Olick, P.C.; Eugene Lieberstein; Michael N. Meller

(57) ABSTRACT

In a disk unit for recording and reproducing information to and from a disk-like recording medium, a disk loading device includes a slot into which a disk-like recording medium is inserted; a retaining member that retains the disk-like recording medium inserted from the slot; a moving member that moves the retaining member so as to retract the disk-like recording medium in a disk insert direction during insertion and expel the disk-like recording medium in a disk eject direction during ejection; a drive mechanism that drives the moving member in the insert direction and the eject direction; and a manual drive member that, when pressed, slidingly engages the drive mechanism and drives the drive mechanism in the eject direction.

15 Claims, 17 Drawing Sheets

DISK LOADING DEVICE HAVING A MANUAL DRIVE MEMBER FOR MOVING A DRIVE MECHANISM IN AN EJECT DIRECTION

BACKGROUND OF THE INVENTION

1. Field of the Invention

The present invention relates generally to a disk loading device, and more particularly, to an improved slot-in type disk loading device for directly inserting and removing a disk-like recording medium.

2. Description of the Related Art

In a disk unit such as for example a CD-ROM device, in which information is recorded and/or reproduced (hereinafter recorded and reproduced) to and from a disk-like recording medium (hereinafter a disk), a disk loading device is provided to both load and eject the disk. These disk loading devices are of two types: A tray type, in which the disk rests on a tray and the tray is moved back and forth to load and eject the disk, and a slot-in type, in which the disk is directly inserted into and ejected from the unit.

In the case of the tray-type disk loading device, racks are formed on the floor and sides of the tray. A motor drives a pinion that engages the racks so as to move the tray to an eject position or a loading position as the case may be.

In the case of the slot-in type disk loading device, a roller located on the inside of the slot is supported by a loading arm and retains the disk in place. When the loading arm rotates in a direction that inserts the disk into the unit, the disk moves to a predetermined loading position. To eject the disk from the unit, the loading arm rotates in an eject direction and expels the disk from the slot.

When the motor does not operate, such as during a power failure, the disk can be ejected by a manual operation (hereinafter manually). The tray type disk loading device is constructed so that the tray can be extracted manually by unlocking a tray lock.

By contrast, in order to eject the disk, the slot-in type is constructed so that the loading arm must rotate in the eject direction, which means that the loading arm must be rotated manually. The conventional slot-in type disk loading device manual eject method, disclosed for example in Japanese Laid-Open Patent Application No. 3-286467, involves inserting a long, thin shaft into an aperture in a front panel of the unit and rotating the shaft so as to rotate a gear that engages a gear on the motor shaft located inside the unit, thus manually rotating the loading arm so as to eject the disk.

However, a disadvantage of the manual eject method disclosed in Japanese Laid-Open Patent Application No. 3-286467 is that, by rotating the shaft inserted into the aperture and thus rotating the motor shaft in the eject direction, the loading arm is rotated in the eject direction via a reduction gear, which requires considerable rotation of the shaft inserted into the aperture, with the result that much time and effort is required to rotate the loading arm in the eject direction and eject the disk from the insertion slot.

SUMMARY OF THE INVENTION

Accordingly, it is an object of the present invention to provide an improved and useful disk loading device in which the above-described disadvantage is eliminated.

The above-described object of the present invention is achieved by a disk loading device comprising:

a slot into which a disk-like recording medium is inserted;

a retaining member that retains the disk-like recording medium inserted from the slot;

a moving member that moves the retaining member so as to retract the disk-like recording medium in a disk insert direction during insertion and expel the disk-like recording medium in a disk eject direction during ejection;

a drive mechanism that drives the moving member in the insert direction and the eject direction; and a manual drive member that, when pressed, slidingly engages the drive mechanism and drives the drive mechanism in the eject direction.

According to this aspect of the invention, simply by pressing the manual drive member the disk can be ejected from the insertion slot, and thus the disk can be ejected more easily and more quickly than with the conventional rotation method.

Additionally, the above-described object of the present invention is achieved by the disk loading device as described above, wherein the manual drive member has a press portion pressed by a pin inserted from a hole provided on a front surface of a unit in which the disk loading device is loaded.

According to this aspect of the invention, it is relatively easy to operate the manual drive member so as to eject the disk.

Additionally, the above-described object of the present invention is achieved by the disk loading device as described above, wherein the manual drive member has a rack that engages a gear of the drive mechanism when the press portion is pressed and the manual drive member moves.

According to this aspect of the invention, the drive mechanism gear can be rotated simply by pushing the press member, without having to rotate the shaft as well as is conventionally the case.

Additionally, the above-described object of the present invention is achieved by the disk loading device as described above, wherein the manual drive member further comprises an impelling member that impels the disk loading device toward a position prior to movement;

a first guide groove for guiding movement of the manual drive member when the press portion is pressed;

a second guide groove for guiding movement of the manual drive member when the press portion is pressed and rotating the manual drive member by using an impelling force of the impelling member so as to separate the rack from the gear of the drive mechanism when pressure on the press portion is released.

According to this aspect of the invention, by repeatedly pressing the press portion of the manual drive member the necessary stroke of the moving member required to eject the disk can be secured.

Additionally, the above-described object of the present invention is achieved by the disk loading device as described above, wherein the drive mechanism comprises:

a motor;

a worm driven by the motor;

a worm wheel that engages the worm;

a first gear that drives the moving member and which is integrated into a single unit with a shaft that passes through the worm wheel;

a clutch plate having a hole that accommodates the shaft and which moves in a direction of the shaft with respect to the worm wheel so as to engage as well as separate from the worm wheel;

a second gear that engages the rack of the manual drive member; and a pressing member interposed between the second gear and the clutch plate so as to press the clutch plate against an inner wall of the worm wheel, the rack of the manual drive member transmitting a rotation of the second gear to the shaft and the first gear and transmitting a rotation of the motor to the first gear via the worm and the worm wheel and the clutch plate.

According to this aspect of the invention, the motor drive route and the manual operating route can be used separately.

Other objects, features and advantages of the present invention will become apparent from the following detailed description when read in conjunction with the accompanying drawings.

DETAILED DESCRIPTION OF THE INVENTION

A detailed description will now be given of a disk loading device according to the present invention, with reference to the accompanying drawings. It should be noted that identical or corresponding elements are given identical or corresponding reference numbers in all drawings, with detailed descriptions thereof given once and thereafter omitted.

Figure 1A:
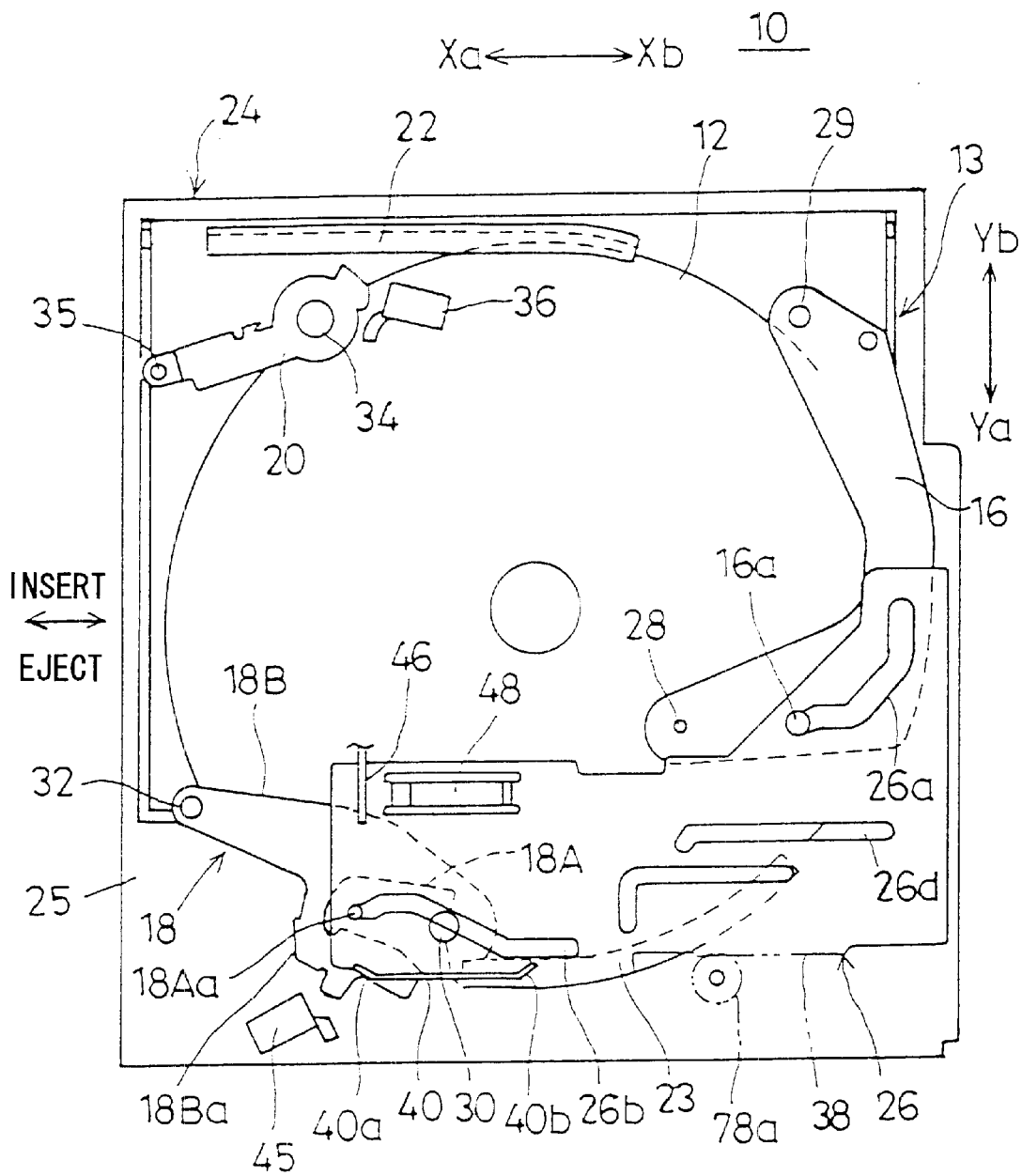
FIGS. 1A and 1B are diagrams showing a plan view of a disk unit according to one embodiment of the present invention and a positional relation of the main slider and the detection switch, respectively.
Figure 1B:
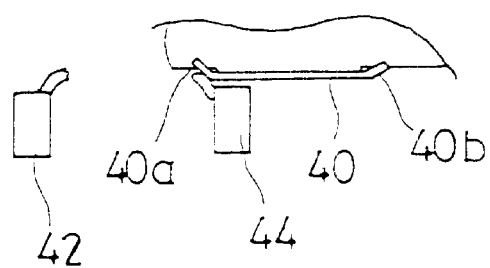

FIGS. 1A and 1B are diagrams showing a plan view of a disk unit according to one embodiment of the present invention and a positional relation of the main slider and the detection switch, respectively.

As shown in FIGS. 1A and 1B, the disk loading device 10 is the so-called slot-in type, in which the disk 12 is inserted directly, having an autoloading mechanism 13 such that when the disk 12 has been inserted halfway the disk 12 is withdrawn automatically into the unit to a loading position, and, after having once been loaded, the disk 12 is ejected by being expelled to a position at which the disk 12 extends halfway out the unit.

The auto-loading mechanism 13 comprises first, second and third loading arms 16, 18 and 20 provided on a floor of a chassis 24 (the chassis 24 best seen in FIG. 2), disk guides 22, 23 to guide the disk 12 into position from both sides of the disk 12, a frame 25 that supports the disk guides 22, 23, and a main slider 26 (moving member) that drives the first and second loading arms 16 and 18.

The first loading arm 16 is rotatably supported about a shaft 28 and has a retention pin 16a that engages a cam groove 26a of the main slider 26. A first roller 29 that holds a periphery of the disk 12 is rotatably supported on a tip of the first loading arm 16. It should be noted that the first roller 29 is formed with a substantially V-shaped slot that accommodates a periphery of the disk 12.

Figure 17A:
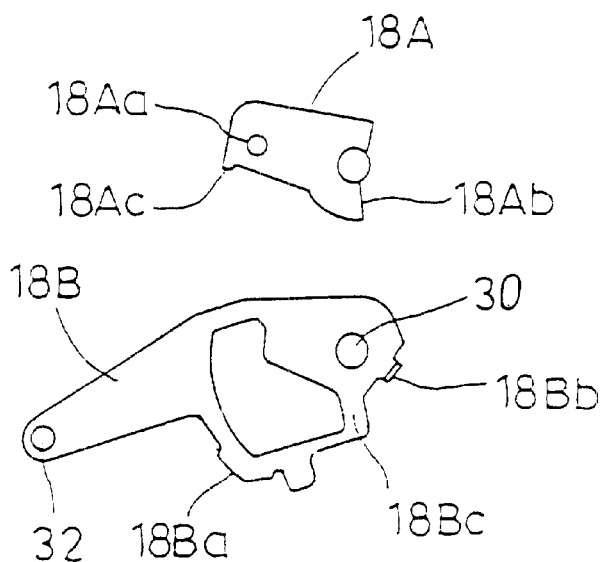
FIGS. 17A, 17B and 17C are diagrams of a structure and operation of a second loading arm, showing plan views of disassembled guide arm and retention arm, a disk loaded state, and an eject state, respectively.
Figure 17B:
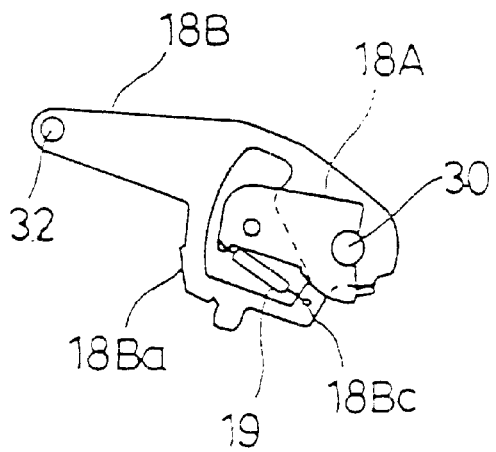
Figure 17C:
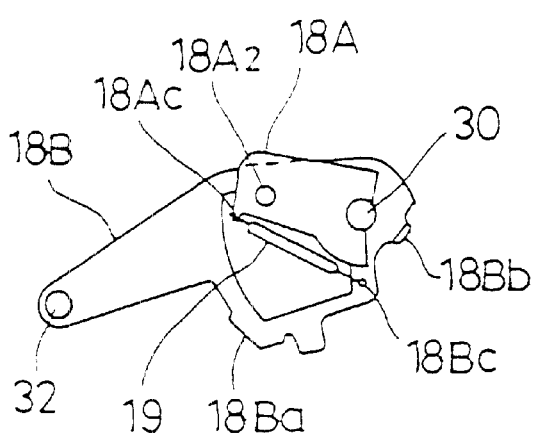

The second loading arm 18, as shown in FIGS. 17A, 17B and 17C, comprises guide arm 18A and retention arm 18B. The guide arm 18A is rotatably supported by a shaft 30 and is provided with an engaging pin 18Aa that fits into a cam groove 26b of the main slider 26. In addition, the retention arm 18B, like the guide arm 18A, is rotatably supported by a shaft 30. A second roller 32 that holds an exit-side periphery of the disk 12 is rotatably supported on a tip of the retention arm 18B.

The guide arm 18A is further provided with a spring engaging portion 18Ac and the retention arm 18B is further provided with a spring engaging portion 18Bc. A coil spring 19 is attached between the spring engaging portion 18Ac and the spring engaging portion 18Bc, so as to urge the retention arm 18B in a clockwise direction with respect to the guide arm 18A. Additionally, a contact portion 18Bb of the retention arm 18B contacts a stopper portion 18Aa of the guide arm 18A, as a result of which the clockwise rotation of the retention arm 18B is restricted. A detection switch 45 (seen for example in FIG. 10A) is turned off prior to the insertion of the disk 12, with the retention arm 18B impelled in a counter-clockwise direction by the insertion of the disk 12.

Figure 9A:
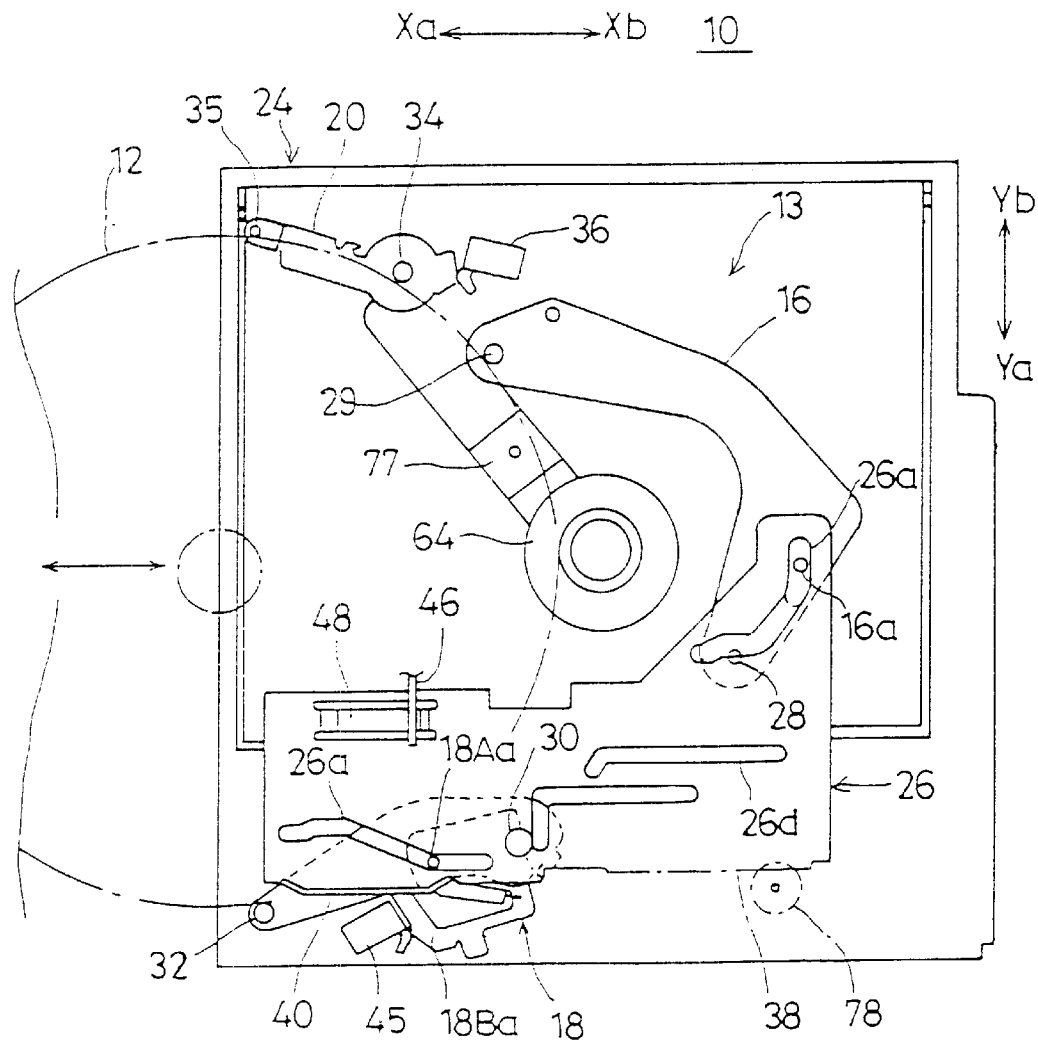
FIGS. 9A and 9B show a plan view of a disk eject state and a positional relation of the main slider and the detection switch, respectively.

The third loading arm 20 is rotatably supported by a shaft 34, and is impelled in the counter-clockwise direction by a torsion spring not shown in the diagram. A third roller 35 that holds the exit-side periphery of the disk 12 is rotatably supported on a tip of the third loading arm 20. Additionally, the third loading arm 20, when rotated clockwise by the insertion of the disk 12, turns the first detection switch 36 on (as can be seen in FIG. 9A). The first detection switch 36 is turned off when the disk is withdrawn by an eject operation (see FIG. 10A).

Additionally, the main slider 26 is slidably supported atop the chassis 24 in such a way as to be slidable in a direction indicated by double-headed arrow Xa–Xb in FIG. 1A, and is further provided with a rack 38 (shown by a double-dash-and-chain line in FIG. 1A) that engages a drive gear 78a (indicated by a double-dot-and-chain line) of a second gear unit 78.

Additionally, the main slider 26, in order to detect a position to which it has moved in the Xa–Xb direction, has a cam plate 40. A second detection switch 42 and a third detection switch 44 are provided atop the chassis 24 and are turned on and off by the movement of the cam plate 40. Slanted flanges. 40a, 40b are provided at either end of the cam plate 40 in order to smooth the press of the cam plate 40 against the detection switches 42, 44.

As shown in FIG. 1B, when the disk 12 is loaded the cam plate 40 separates from the second and third detection switches 42, 44. Therefore, the second and third detection switches 42, 44 are turned off during loading of the disk 12.

Additionally, as will be described later, the main slider 26 has an angular cam 48 that slidingly contacts a clamp holder pin 46. The angular cam 48 presses the clamp holder pin 46 and raises the clamp when the main slider 26 slides in the Xa direction with the disk insertion and disk ejection.

Figure 2:
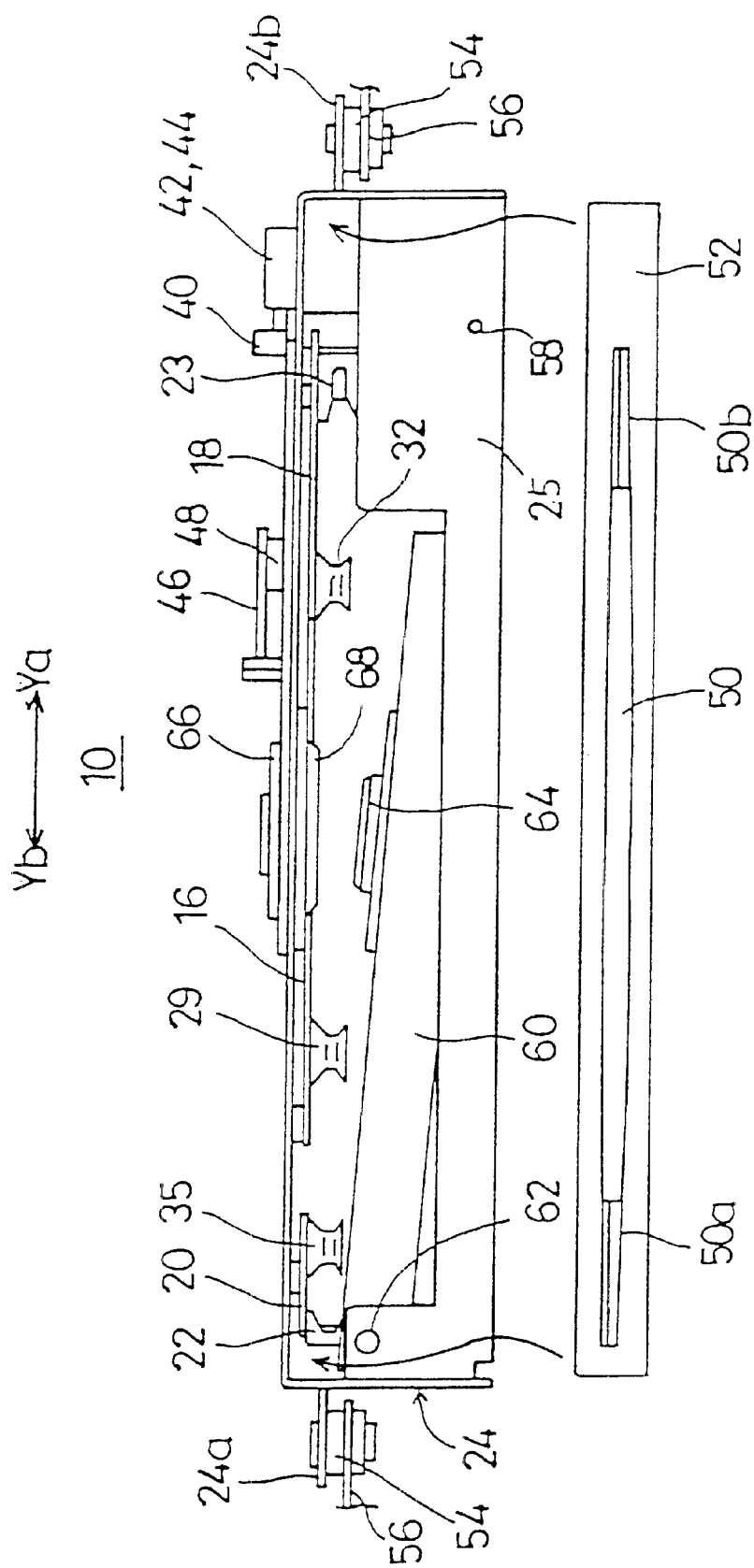
FIG. 2 is a front view of the disk loading device.

FIG. 2 is a front view of the disk loading device.

As shown in FIG. 2, the disk loading device 10 comprises a slit plate 52 having a disk insertion slot 50 (hereinafter insertion slot), the slit plate 52 being mounted to the chassis 24 as shown in the arrows. It should be noted that the insertion slot 50 is wider at an intermediate portion than at either left and right lateral ends thereof. Additionally, the insertion slot 50 is provided with felt portions 50a, 50b at either left and right lateral ends thereof.

Disk guides 22 and 23 and first roller 29, second roller 32 and third roller 35 are located at the height at which the disk insertion slot 50 is located.

Mounting portions 24a, 24b protruding from both sides of the chassis 24 are fixedly mounted to brackets 56 via insulator rubber 54. An emergency hole 58 to be used during power outages and other emergencies is provided on a front surface of a frame 25 installed on the interior of the chassis 24.

Additionally, a shaft 62 of a sub-chassis 60 is rotatably supported by the frame 25. A turntable 64 that rotatably drives the disk 12 is provided on the sub-chassis 60. Before the disk 12 is inserted the sub-chassis 60 rotates clockwise and the turntable 64 descends.

A clamper 68 supported by the clamper holder 66 is disposed opposite to and above the turntable 64. The clamper holder 66, which has the clamper holder pin 46 described above, is raised by the movement of the angular cam 48. Prior to the insertion of the disk 12, the clamper holder 66 is rotated so as to raise the clamper 68.

Figure 3:
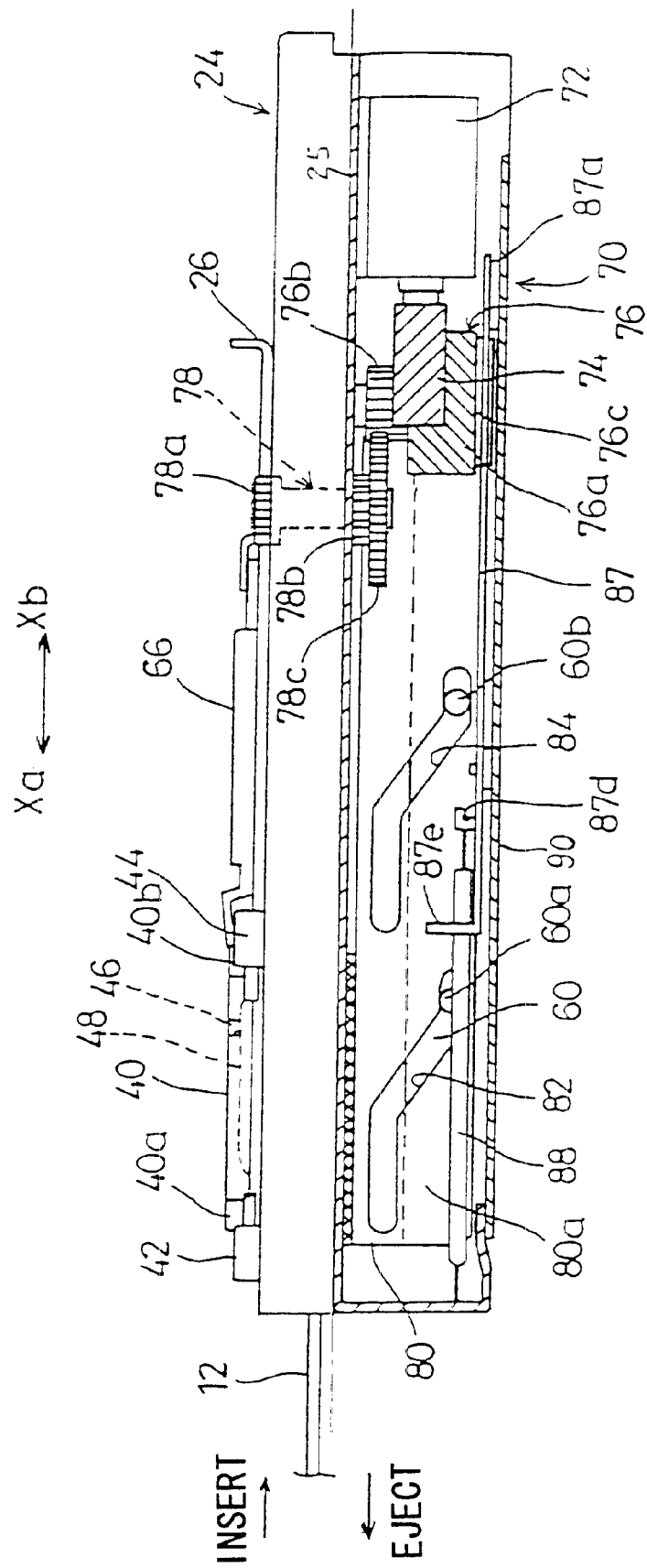
FIG. 3 is a cross-sectional view of a lower half of the disk loading device.
Figure 4:
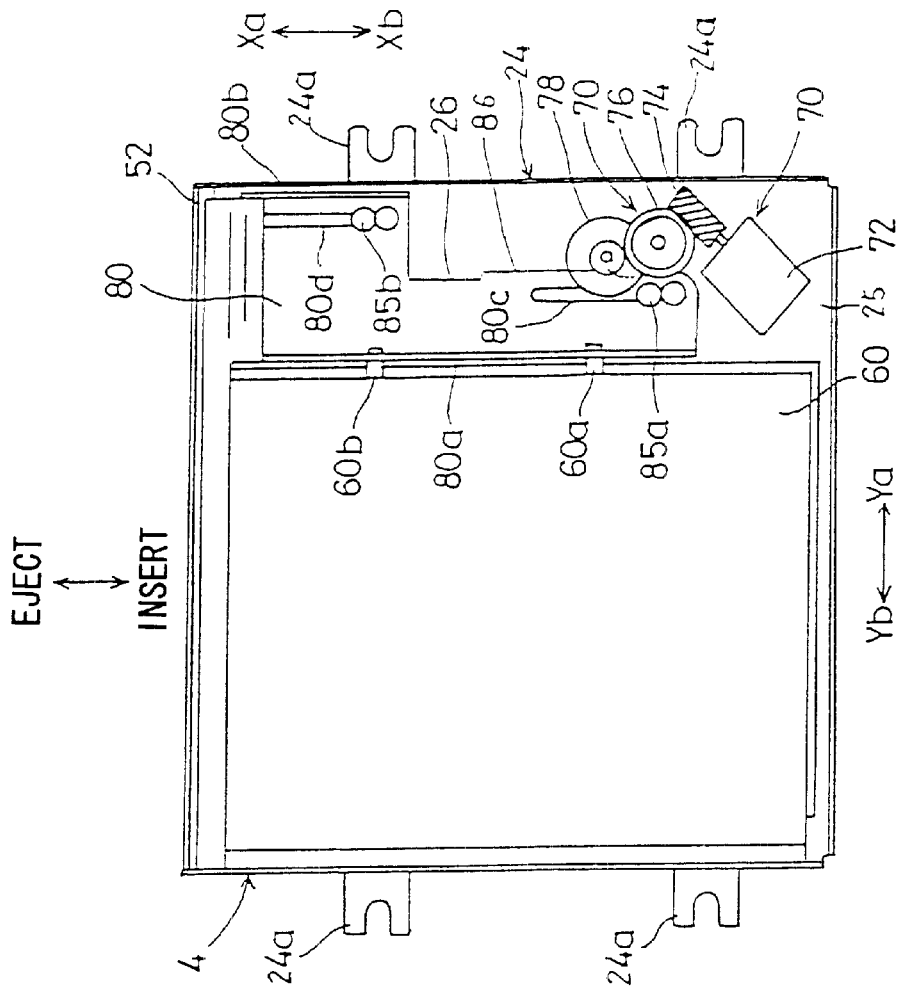
FIG. 4 is a bottom view of the disk loading device 10.
Figure 5:
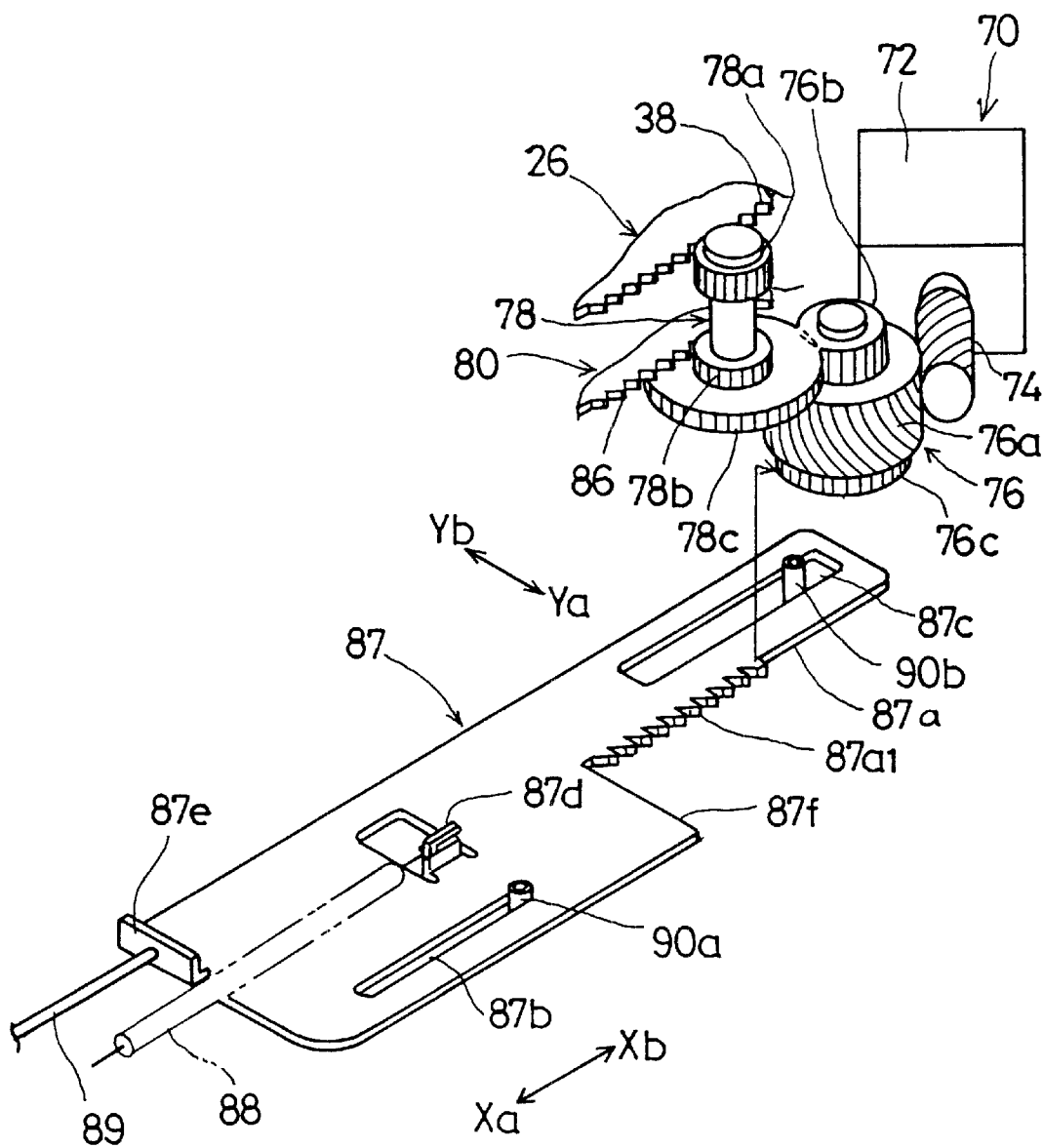
FIG. 5 is a perspective view of the drive mechanism and manual eject mechanism according to one embodiment of the present invention.

FIG. 3 is a cross-sectional view of a lower half of the disk unit 10. FIG. 4 is a bottom view of the disk unit 10. FIG. 5 is a perspective view of the drive mechanism and manual eject mechanism according to one embodiment of the present invention.

As shown in FIGS. 3, 4 and 5, a drive mechanism 70 is provided on a lateral portion of the frame 25, the drive mechanism 70 serving to drive the arms 16, 18, the sub-chassis 60 and the damper holder 66 in such a way as to load the disk 12.

The drive mechanism 70 comprises a motor 72, a worm gear 74 rotatably driven by the motor 72, a first gear unit 76 having a worm wheel 76a that meshes with the worm gear 74, and a second gear unit 78 having a large-diameter gear 78c that engages a small-diameter gear 76b of the first gear unit 76.

A sub-slider 80 that raises the sub-chassis 60 is supported by side walls of the frame 25 so as to be slidable in the Xa–Xb direction. Crank-shaped cam grooves 82, 84 that engage the pair of pins 60a, 60b which project from the edge of the sub-chassis 60 are formed in a first side wall 80a of the sub-slider 80.

An upper surface of the sub-slider 80 is provided with guide grooves 80c, 80d that extend in the Xa–Xb direction. The guide grooves 80c, 80d engage pins 85a, 85b that project from the frame 25 and restrict the sliding of the sub-slider 80. Additionally, the subslider 80 has a rack 86 that engages the small-diameter gear 78b of the second gear unit 78.

It should be noted that the sub-slider 80 is driven by a sub-slider drive mechanism (not shown in the diagram) comprising a linkage connected to the main slider 26 between the time ejection begins and the clamp is released, thus causing the rack 86 to engage the small-diameter gear 78b of the second gear unit 78. Accordingly, the sub-slider 80 is driven by the second gear unit 78 only from the time ejection begins until the time the clamp is released.

As a result, when the rotary motion of the motor 72 is transmitted to the sub-slider 80 via the first and second gear units 76, 78, the sub-slider 80 is moved in either the Xa or the Xb direction. Accordingly, when the disk 12 is inserted with the unit in the standby state shown in FIG. 3, the sub-slider 80 is driven in the Xb direction and the pins 60a, 60b of the sub-chassis 60 are driven upward along the cam grooves 82, 84, so the sub-chassis 60 moves upward and contacts the turntable 64 to a lower surface of the disk 12.

Additionally, as described above, the drive gear 78a of the second gear unit 78 engages the rack 38 of the main slider 26 and the main slider 26 is slid back and forth in the Xa–Xb direction described above via the second gear unit 78.

By sliding the main slider 26 in the Xb direction, the damper holder pin 46 of the damper holder 66 passes through the angular cam 48 and the damper 68, which is supported by the damper holder 66, descends to a disk clamp position. In so doing, the disk 12 is clamped firmly between the turntable 64 and the damper 68, so that information recorded on a recording surface of the disk can be reproduced by the optical pick-up 77.

Additionally, an eject slider (manual drive member) 87 capable of sliding back and forth in the Xa–Xb direction by manual operation during a power outage or other such emergency is provided on a top surface of a floor plate of the chassis 24, at a point opposite a bottom of the sub-slider 80. The eject slider 87 has an extension 87a that extends in the Xb direction from a left lateral side of the eject slider 87, with a side portion of the extension 87a having a rack 87a1.

When the eject slider 87 is pushed in the Xb direction, the rack 87a1 engages an emergency gear 76c provided on a lower edge of the first gear unit 76 The eject slider 87 has first and second guide grooves 87b, 87c (seen for example in FIG. 14) into which a pair of bosses 90a, 90b projecting upward from the bottom chassis 90 are inserted. The guide grooves 87b, 87c each extend back and forth in the Xa–Xb direction, and by engaging the bosses 90a, 90b guide the eject slider 87 in the Xa–Xb direction.

In addition, guide groove 87b is formed so as to be wider than an outer periphery of the boss 90a, so the eject slider 87 can move essentially free of friction. Moreover, the other guide groove 87c is also formed so as to be wider than an outer periphery of the boss 90b, so that the eject slider 87 can slide in a state in which it is also possible for the eject slider 87 to oscillate in a Ya–Yb direction that is perpendicular to the sliding direction Xa–Xb.

Additionally, the eject slider 87 has a spring retention portion 87*d* that retains one end of a coil spring 88 (urging member), so that the spring force of the coil spring 88 impels the eject slider 87 in the in the Xa direction. As a result, the eject slider 87 is ordinarily moved in the Xa direction, with the rack 87*a*1 withdrawn to a position at which it does not engage the emergency gear 76*c* of the first gear unit 76.

Additionally, the eject slider 87 is provided with the guide groove 87*b* on a Yb side thereof and the guide groove 87*c* on the Ya side thereof. Further, the eject slider 87 is configured so that the spring retention portion 87*d* is located at a position intermediate between Ya- and Yb-direction ends thereof, with the manual eject button 87*e* provided on a Ya side thereof.

When a press portion 87*e* provided at a Ya side of the eject slider is pressed in the Xb direction by a manual eject emergency pin 89 to be described later, the fact that the width of the guide groove 87*c* is larger than the periphery of the boss 90*b* causes the eject slider 87 to swing in the clockwise direction around the boss 90*a* (see FIGS. 11, 12).

In so doing, when the emergency pin 89 pressure acts on the press portion 87*e* provided on the Ya side of the eject slider, the eject slider 87 slides in the Xb direction and the rack 87*a*1 rotates in the Yb direction so as to engage the first gear unit 76 emergency gear 76*c*. If the press portion 87*e* is further pressed in the Xb direction in such state of engagement, then the rack 87*a*1 slides in the Xb direction, at the same time rotating the small-diameter gear 76*b* of the first gear unit 76 and rotatably driving the second gear unit 78 in the eject direction (see FIG. 13).

Figure 6:
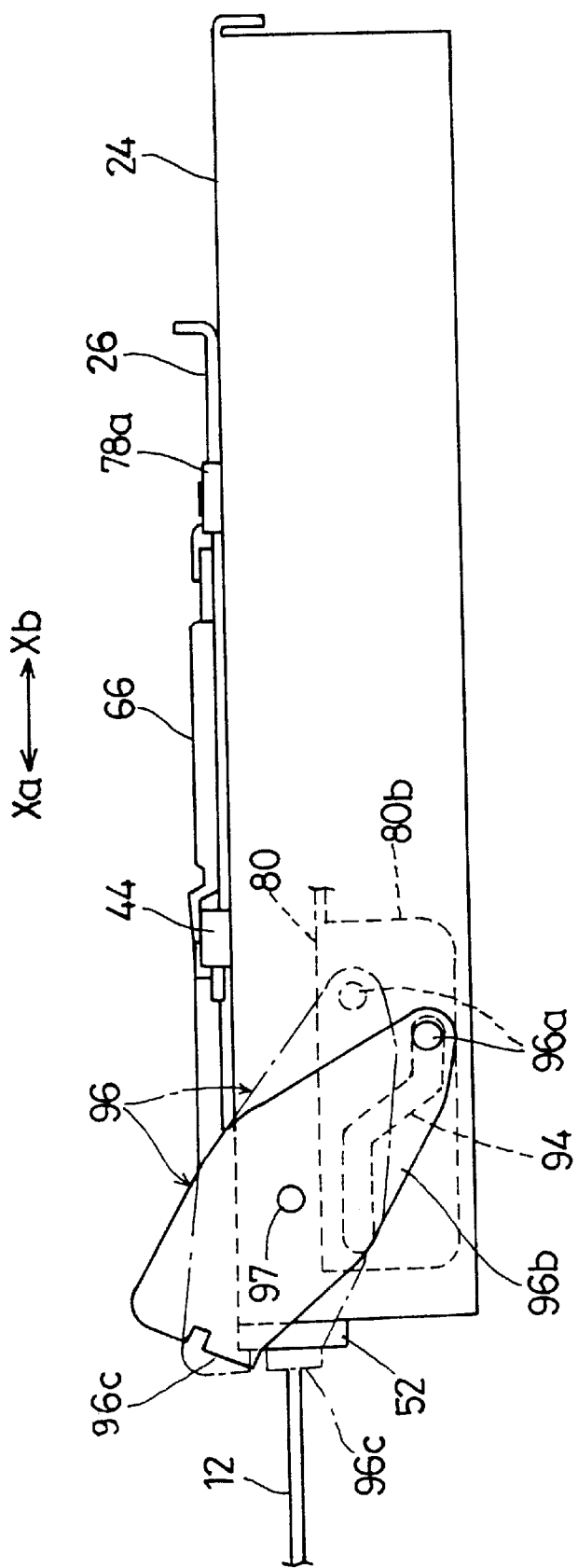
FIG. 6 is a lateral view of an opening and a closing of a shutter.

FIG. 6 is a lateral view of an opening and a closing of a shutter.

As shown in FIG. 6, a second side plate 80*b* of the sub-slider 80 is formed with a crank-shaped cam groove 94 (indicated by the dashed line in FIG. 5). The cam groove 94 engages a pin 96*a* of a shutter 96 that opens and closes the insertion slot 50 provided on the slit plate 52.

The shutter 96 comprises a pair of arm portions 96*b* rotatably supported by a shaft 97 provided opposite both lateral sides of the chassis 24 and a central bridge portion 96*c* that opposes a front edge of the insertion slot 50 and which lies between the pair of arm portions 96*b*. Additionally, arm portion 96*b* opposite the second side plate 80*b* of the sub-slider 80 is provided with the engaging pin 96*a* that engages the cam groove 94 described above.

As a result, the movement of the second side plate 80*b* having the cam groove 94 causes the shutter 96 to rotate between open and closed positions that open and close the insertion slot 50. Accordingly, when the disk 12 is inserted or ejected, the shutter 96 rotates upward and opens the insertion slot 50. When the disk 12 is loaded and clamped atop the turntable 64 the shutter 96 rotates downward (to a position indicated by a dashed line in FIG. 5) and closes the insertion slot 50.

A description will now be given of the composition of the first gear unit 76.

Figure 7A:
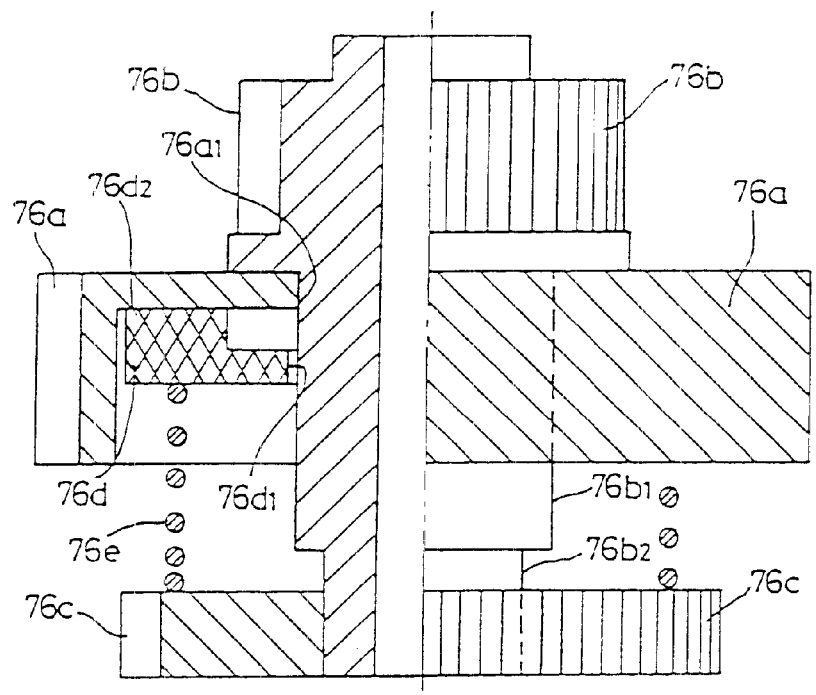
FIG. 7 shows s vertical cross-sectional view of a first gear unit together with a corresponding partially enlarged lateral view of a clutch mechanism inside the first gear unit.
Figure 7B:
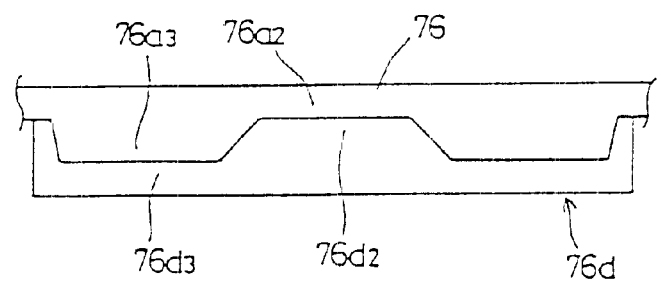

FIGS. 7A and 7B show a vertical cross-sectional view of a first gear unit 76 together with a corresponding partially enlarged lateral view of a clutch mechanism inside the first gear unit 76, respectively. Additionally, FIG. 8 is an exploded perspective view of the structure of the first gear unit 76.

Figure 8:
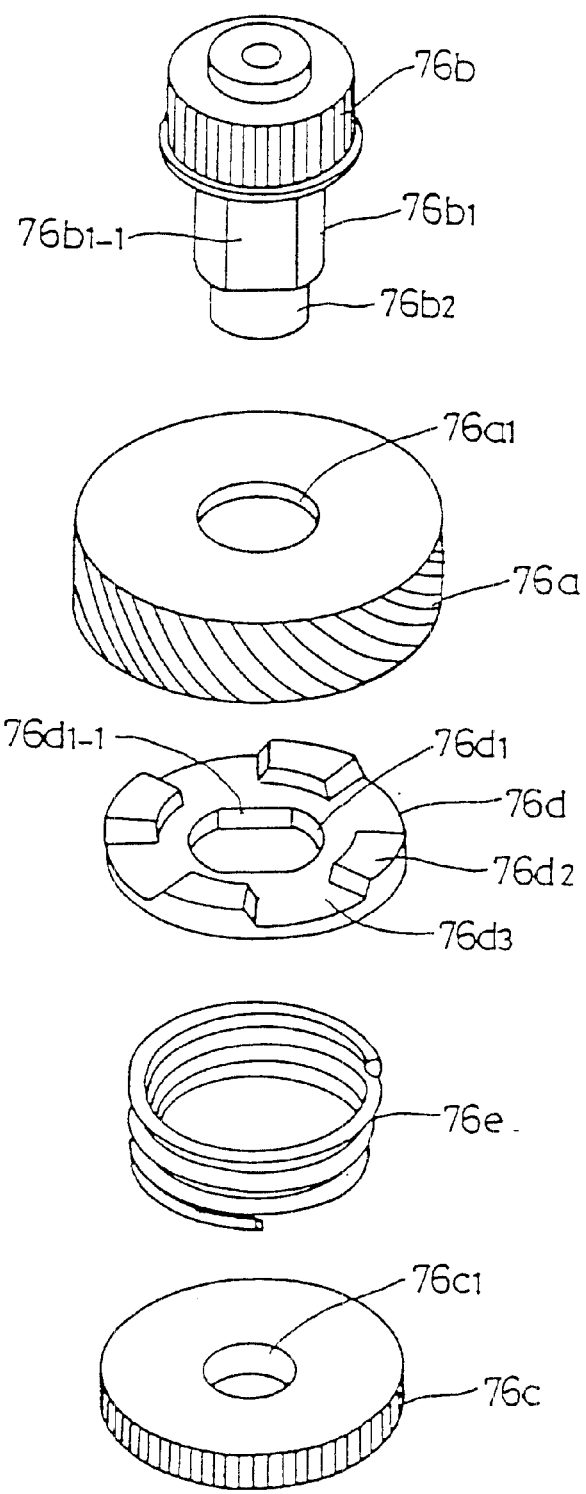
FIG. 8 is an exploded perspective view of the structure of the first gear unit.

As shown in FIG. 7A and FIG. 8, the first gear unit 76 comprises a worm gear 74, a worm wheel 76*a* that meshes with the worm gear 74, and small-diameter gear 76*b* (a first gear), an emergency gear 76*c* (a second gear), a clutch plate 76*d* the forms a clutch mechanism inside the worm wheel 76*a*, and a coil spring 76*e* (pressing member) that presses the clutch plate 76*d* against an inner wall of the worm wheel 76*a*. The small-diameter gear 76*b* has a first shaft 76*a*1 that penetrates a central hole 76*a*1 in the worm wheel 76*a* and a second shaft 76*b*2 that penetrates a central hole 76*c*1 in the emergency gear 76*c*.

The first shaft 76*a*1 has two engaging surfaces 76*a*1-1 formed of a portion of reduced thickness along an outer periphery of the shaft, the surfaces being parallel to each other. Similarly, a central hole 76*d*1 in the clutch plate 76*d* is likewise formed with engaging portions 76*d*1-1 to accommodate the portion of reduced thickness of the first shaft 76*a*1 that constitutes the engaging surfaces 76*a*1-1.

As shown in FIG. 7B, substantially trapezoidal convexities 76*d*2 as well as similarly trapezoidal concavities 76*d*3 are formed in an upper surface of the clutch plate 76*d*, the convexities 76*d*2 alternating with the concavities 76*d*3 around a periphery of the clutch plate 76*d*.

Likewise, trapezoidal concavities 76*a*2 for accommodating the clutch plate 76*d* convexities 76*d*2 are formed on the inner wall of the worm wheel 76*a* that is disposed opposite the upper surface of the clutch plate 76*d*. Similarly, trapezoidal convexities 76*a*3 that are accommodated by the clutch plate 76*d* concavities 76*d*3 are formed on the inner wall of the worm wheel 76*a* that is disposed opposite the upper surface of the clutch plate 76*d*, the convexities 76*a*3 alternating with the concavities 76*a*2 around a periphery of the clutch plate 76*d*.

Additionally, the clutch plate 76*d* is impelled upward by the spring force of the coil spring 76*e*, so the convexities 76*d*2 and the concavities 76*d*3 engage and mesh with the concavities 76*a*2 and convexities 76*a*3 formed in the inner wall of the worm wheel 76*a*. As a result, the rotational driving force of the worm 74 is transmitted to the second gear unit 78 large-diameter gear 78*c* via the worm wheel 76*a*, the clutch plate 76*d* that is meshed with the concavities 76*a*2 and convexities 76*a*3 of the worm wheel 76*a*, the first shaft 76*a*1 that engages the engaging portions 76*d*1-1 of the central hole 76*d*1 of the clutch plate 76*d*, and the small-diameter gear 76*b* that is integrated with the first shaft 76*a*1.

Additionally, the convexities 76*d*2, concavities 76*d*3, concavities 76*a*2 and convexities 76*a*3 are formed in substantially trapezoidal shape when viewed laterally, so an excessive load causes the slanted portions to slip and the clutch to slip as well. As will be described later, such an arrangement serves to break the path of transmission of the worm 74 and the work wheel 76*a* and thus lighten the load when operating a manual eject.

A description will now be given of an ejection of a disk 12 from the disk loading device 10 having the structure described above.

Figure 9B:
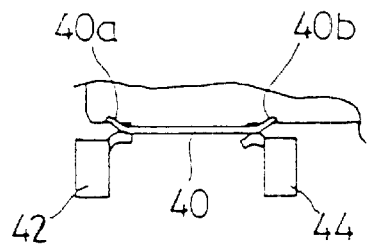

FIGS. 9A and 9B show a plan view of a disk eject state and a positional relation of the main slider and the detection switch, respectively.

As shown in FIG. 9A, when ejecting the disk 12 which is clamped between the turntable 64 and the damper 68, pressing an eject button not shown in the diagram causes the drive mechanism 70 second gear unit 78 to be rotatably driven in the counter-clockwise direction by the motor 72, so that the main slider 26 and the sub-slider 80 are slid in the Xa direction.

When the sub-slider 80 is slid in the Xa direction, the sub-chassis 60 pins 60*a*, 60*b* that engage the sub-slider 80 cam grooves 82, 84 move downward together with the movement of the cam grooves 82, 84. As a result, the turntable 64, which is supported by the sub-chassis 60, is lowered from a disk clamp position to a clamp release position.

Additionally, when the main slider 26 slides in the Xa direction, the movement of the angular cam 48 moves the damper 68 supported by the damper holder 66 from a disk clamp position to a clamp release position above the disk clamp position.

After the lowering of the turntable 64 and the rise of the damper 68, the main slider 26 slides further in the Xa direction and the first and second arms 16, 18 (18A, 18B) rotate in the counter-clockwise direction. At this time, the first arm 16 moves the disk 12 from the loading position toward the Xa direction. The third arm 20 is pressed by the disk 12 and rotates in the clockwise direction. The second loading arm 18 rotates in the clockwise direction together with the guide arm 18A and the roller 32 is driven by the first arm 16 in the Xa direction by the disk 12, which causes the retention arm 18B to rotate counter-clockwise with respect to the guide arm 18A.

Accordingly, the roller 32 provided at the tip of the retention arm 18B is impelled by the force of the coil spring 19 so as to contact and press against the periphery of the disk 12. At this time, a pressing portion 18Ba of the retention arm 18B contacts the fourth detection switch 45, which causes the detection switch 45 to turn on (see FIGS. 9A and 9B).

As a result, the disk 12 is supported from three directions by the rollers 29, 32 and 35 provided on the tip portions of the arms 16, 18, 20, and further, the disk 12 is moved in the eject direction (the Xa direction) by the pressure of the roller 29 while being supported by the disk guides 22, 23.

As shown in FIG. 9B, when the disk 12 is ejected to a position halfway out of the insertion slot 50, the slanted portions 40a, 40b at both ends of the cam plate 40 press against the second and third detection switches 42, 44 and turn both the second and third detection switches 42, 44 on. When both the second and third detection switches 42, 44 turn on, the motor 72 temporarily stops rotating.

When the ejected disk 12 has been removed from the insertion slot 50, the motor 72 starts rotating again and slides the main slider 26 in the Xa direction. As a result, the arm 16 rotates in the counter-clockwise direction, the roller 29 is brought near a rear side of the insertion slot 50 and the unit is readied for insertion. At this time, the roller 29 is positioned virtually opposite the insertion slot 50.

As such, after the disk 12 has been ejected and then withdrawn manually from the unit, the roller 29 is positioned opposite the rear side of the insertion slot 50, so the next time the disk 12 is inserted the leading edge of the disk 12 is promptly engaged by the roller 29. As a result, the disk 12 is prevented from being inserted at a position not aligned with the roller 29, so that even if the insertion of the disk 12 into the insertion slot 50 is not level but is slightly slanted up or down, the disk 12 can nevertheless be securely engaged by the roller 29.

Figure 10A:
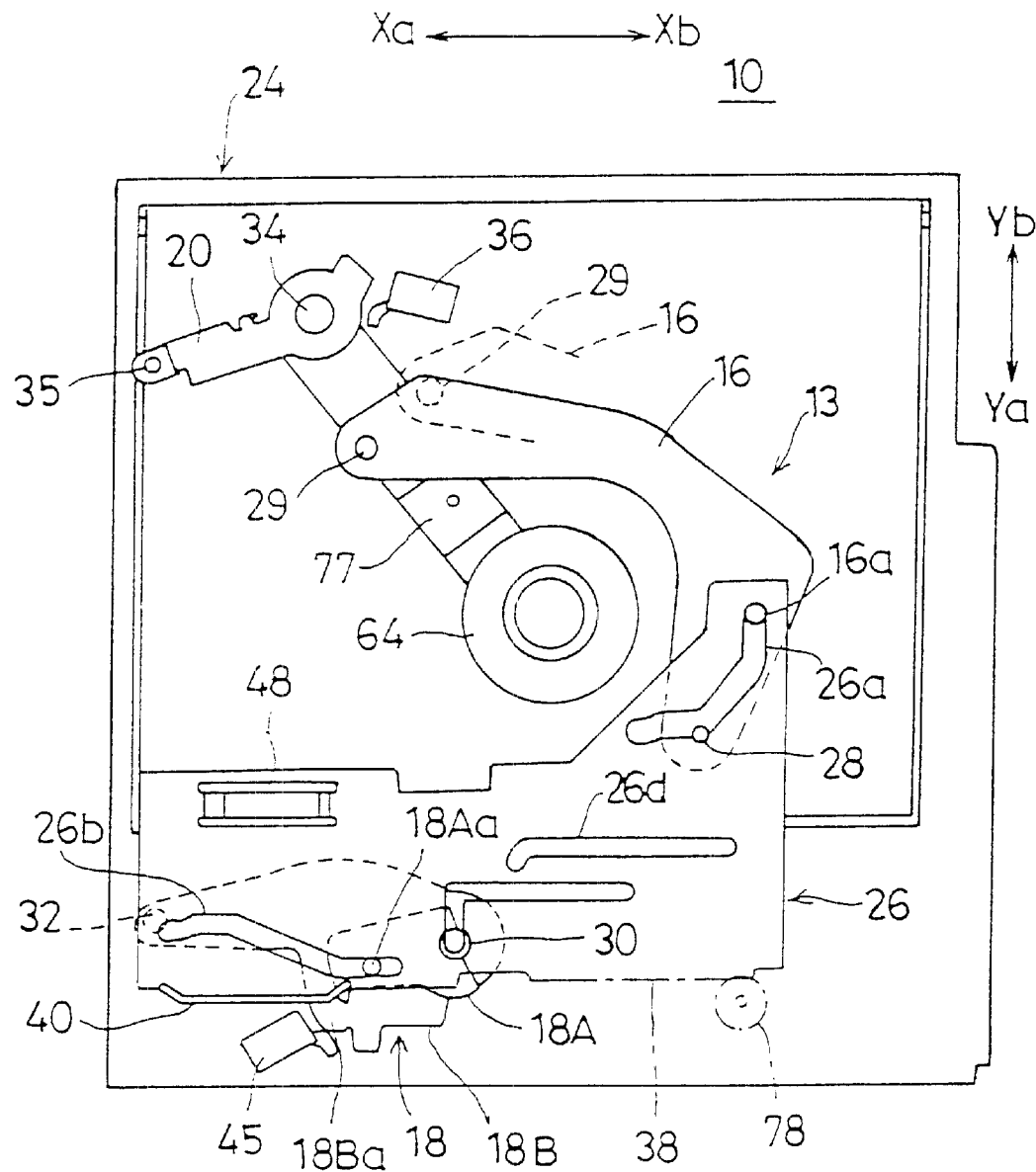
FIGS. 10A and 10B show a plan view of a disk insert standby state and a positional relation of the main slider and the detection switch, respectively.
Figure 10B:
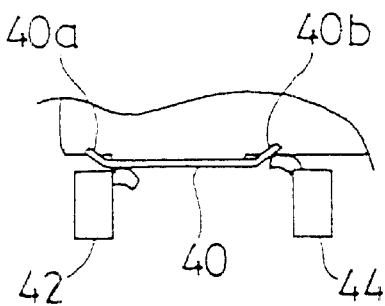

FIGS. 10A and 10B show a plan view of a disk insert standby state and a positional relation of the main slider and the detection switch, respectively.

As shown in FIG. 10A, once the disk 12 is removed the disk loading device 10 is put into a standby state, awaiting the insertion of the disk.

Additionally, once an operator removes the disk 12 from the insertion slot 50, the second loading arm 18 is impelled by the force of the coil spring 19 so that the retention arm 18B rotates in the clockwise direction with respect to the guide arm 18A. At this time, a pressing portion 18Ba of the retention arm 18B separates from the fourth detection switch 45, which causes the detection switch 45 to turn off.

As shown in FIG. 10B, when the arm 16 is rotated to the standby position awaiting the insertion of the disk 12, the slanted portion 40a on the left side of the cam plate 40 presses the second detection switch 42 and, at the same time, the slanted portion 30b on the right side of the cam plate 40 separates from the third detection switch 44. As a result, the third detection switch 44 turns off and the second detection switch 42 turns on, thus halting the rotation of the motor 72.

Additionally, when the disk 12 is inserted and loaded, each of the arms 16, 18 (18A, 18B) and 20 perform operations exactly the reverse of the above-described eject operation, thus clamping the disk 12 in place via the turntable 64 and the damper 68.

As described above, with the disk loading device 10 the loading and the ejection of the disk 12 is accomplished by rotation of the individual arms 16, 18 (18A, 18B) and 20.

A description will now be given of a method for ejecting the disk 12 manually when the drive mechanism 70 motor 72 cannot be driven.

Figure 11:
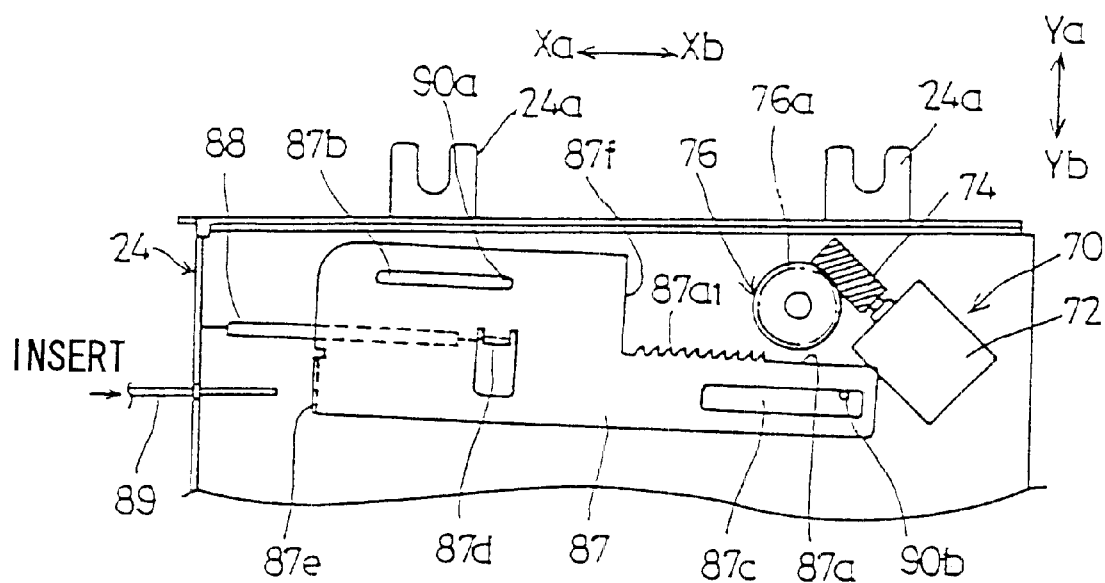
FIG. 11 is a bottom view of an initial stage of a manual eject operation.

FIG. 11 is a bottom view of a state of the drive mechanism 70 prior to ejection of a disk. FIG. 12 is a bottom view of an initial stage of a manual eject operation.

As shown in FIG. 11, prior to ejection the drive mechanism 70, the eject slider 87 is moved in the Xa direction, so that the rack 87a1 is separated from the first gear unit 76 emergency gear 76c.

If, for example, power is lost while the disk 12 is clamped in place inside the unit and it is no longer possible to automatically eject the disk 12, then the disk 12 may be ejected manually. In such a case, the operator inserts a long thin shaft called an emergency pin 89 into the emergency hole 58 provided on the front surface of the unit.

The emergency pin 89 is inserted into the emergency hole 58 from the Xb direction, so that a tip of the emergency pin 89 contacts a press portion 87e provided at the Ya side of the eject slider 87 (see FIG. 5). Further, when the emergency pin 89 is pressed in the Xb direction, the eject slider 87 moves in the Xb direction against the spring force of the coil spring 88.

Figure 12:
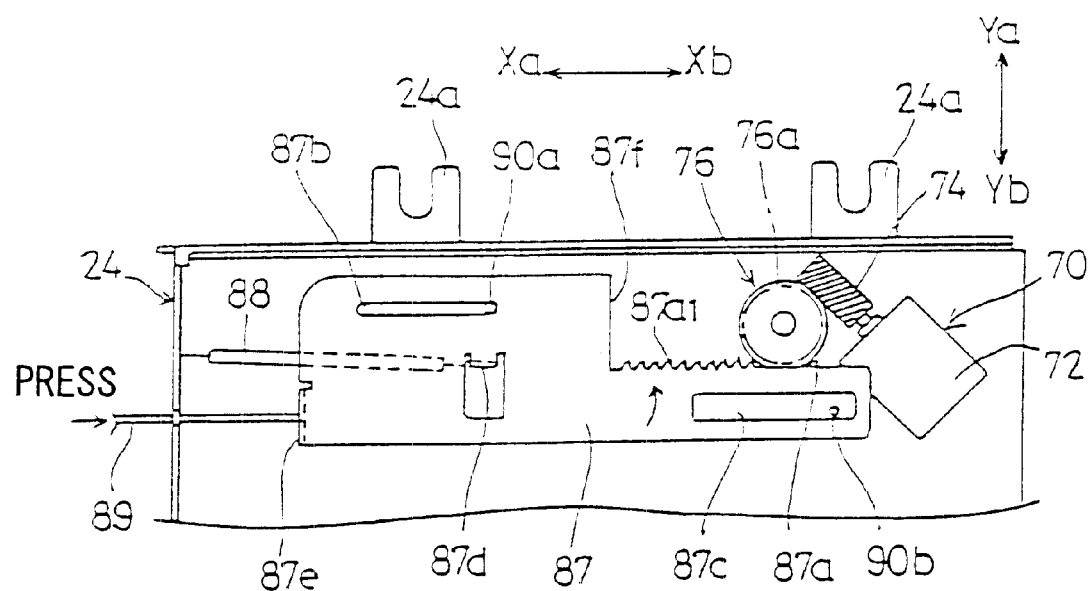
FIG. 12 is a bottom view of a state of the drive mechanism prior to ejection of a disk.

At this time, the eject slider 87, as shown in FIG. 12, one boss 90a firmly engages one guide groove 87b and the other boss 90b firmly engages the other guide groove 87c, so that when the emergency pin 89 presses against the press portion 87e, which is provided at a point shifted toward the Ya direction with respect to the boss 90a, the eject slider 87 rotates counter-clockwise with respect to the boss 90a.

When the eject slider 87 rotates in the counter-clockwise direction (the Ya direction in FIG. 12), a side portion of the extension 87a that extends in the Xb direction from a left lateral side of the eject slider 87 contacts the emergency gear 76c of the first gear unit 76 and, sliding in the Xb direction, causes the rack 87a1 on the extension 87a to contact the emergency gear 76c.

Figure 13:
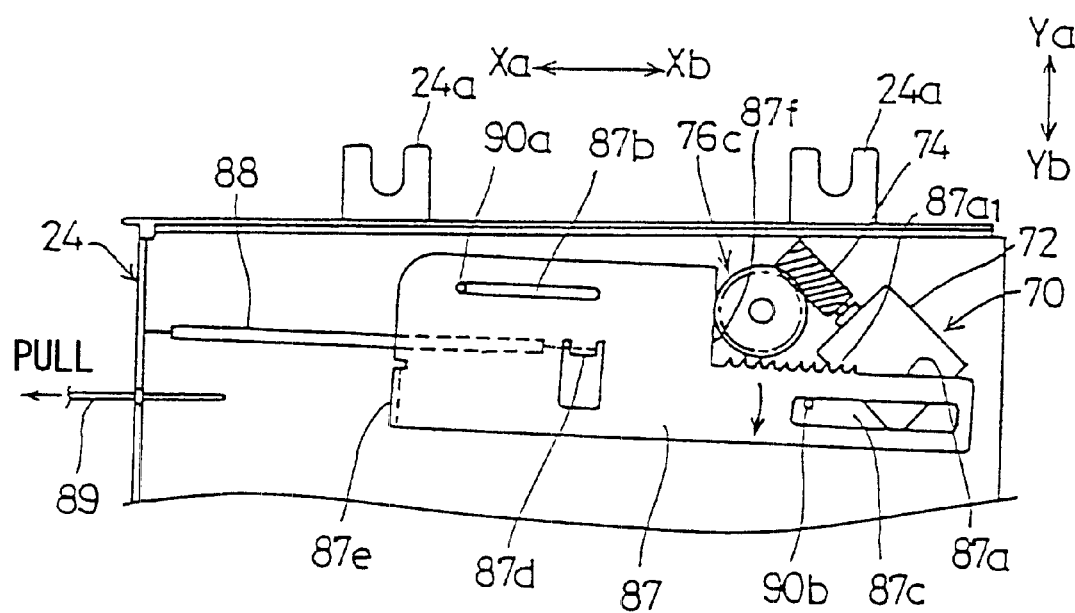
FIG. 13 is a bottom view of a state in which a rack of the eject slider rotatably drives and emergency gear.

FIG. 13 is a bottom view of a state in which an emergency pin 89 is retracted in an Xa direction.

As shown in FIG. 13, when the press portion 87e of the eject slider 87 is pushed by the emergency pin 89, the emergency gear 76c is rotated in the counter-clockwise direction and the groove 87b of the eject slider 87 slides to a stop position contacting the boss 90a of the bottom chassis 90.

Figure 14:
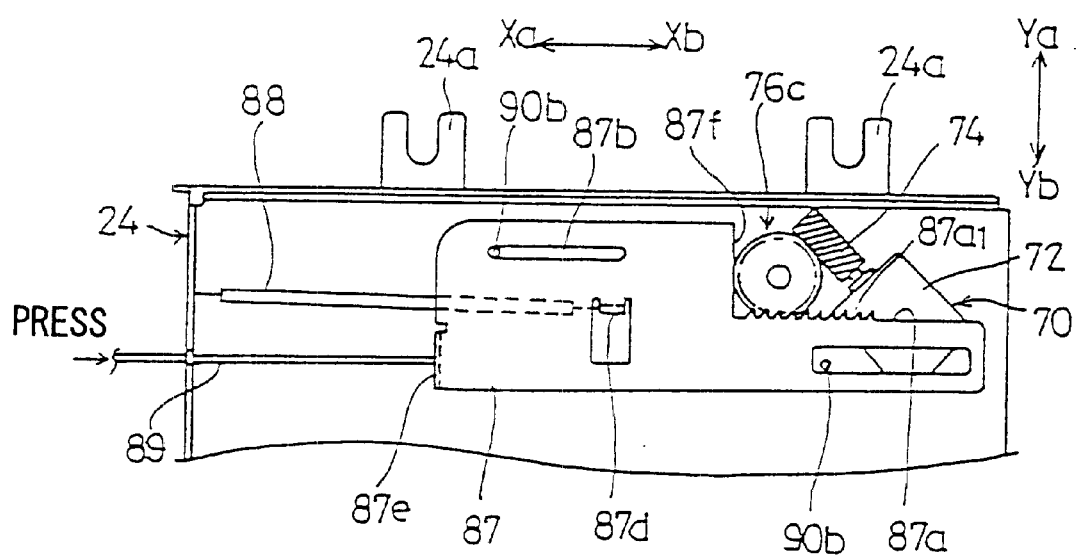
FIG. 14 is a bottom view of a state in which an emergency pin is retracted in an Xa direction.

FIG. 14 is a bottom view of a state in which the rack 87a1 of the eject slider 87 rotatably drives the emergency gear 76c.

As shown in FIG. 14, after a step portion 87f of the eject slider 87 contacts the emergency gear 76c, the emergency pin 89 is withdrawn in the Xa direction and the eject slider 87 is impelled by the spring force of the coil spring 88 to rotate in a clockwise direction (shown as Yb in FIG. 13), so that the rack 87a1 separates from the emergency gear 76c of the first gear unit 76.

Then, the eject slider 87 is impelled by the spring force of the coil spring 88 to move in the Xa direction so as to return to a position prior to manual eject (see FIG. 11).

Next, by again pressing the press portion 87e of the eject slider 87 in the Xb direction, the eject operation described above is repeated and the main slider 26 can be moved in the Xa eject direction.

Figure 15:
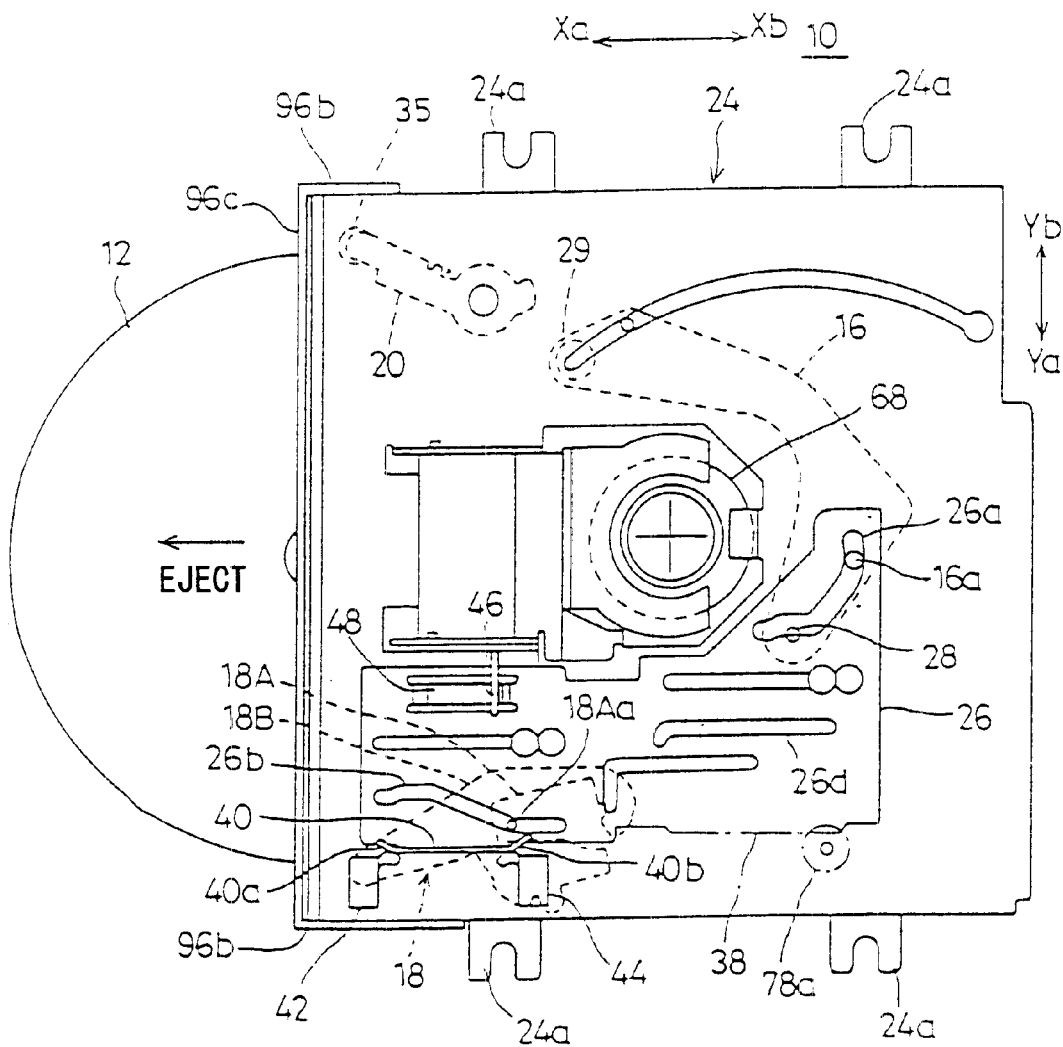
FIG. 15 is a plan view of a disk eject state.

FIG. 15 is a plan view of a disk eject state.

As shown in FIG. 15, when the emergency pin 89 is inserted from the emergency hole 58 and the eject slider 87 press portion 87e is pressed multiple times in the Xb direction, the second gear unit 78 is rotatably driven in the counter-clockwise direction via the first gear unit 76, and the main slider 26 and the sub-slider 80 are driven in the eject direction (Xa).

As a result, when as described above the main slider 26 and the sub-slider 80 slide in the Xa direction, the pins 60a, 60b of the sub chassis 60 that engage the sub-slider 80 cam grooves 82, 84 move downward with the movement of the cam grooves 82, 84 (refer to FIG. 3). Accordingly, the turntable 64 that is supported by the sub chassis 60 descends from a disk clamp position to a clamp release position (see FIG. 2).

Additionally, the pin 96a of the shutter 96 that engages the cam groove 94 of the sub-slider 80 moves downward with the movement of the cam groove 94. In so doing, the shutter 96 moves from the closed position to the open position (shown as a solid line in FIG. 6).

As the main slider 26 slides in the Xa direction, the movement of the angular cam 48 causes the damper 68 (which is supported by the damper holder 66) to move from the disk clamp position to the clamp release position above the disk clamp position.

Further, when the main slider 26 slides in the Xa direction, the first and second arms 16 and 18 rotate in the counter-clockwise direction and the disk 12 is moved from the loaded position to the eject direction (Xa).

As a result, the disk 12, which remains supported by the rollers 29, 32 and 35 provided on the tip portions of the arms 16, 18 and 20, moves to the position shown in FIG. 15. Thus, simply by carrying out the simple manual operation of pushing the press portion 87e of the eject slider 87 multiple times in the Xb direction using the emergency pin 89, the disk 12 loaded in the interior of the unit can be retrieved relatively simply.

Accordingly, the operator does not need to bother with manually rotating a jig so as to rotate a gear as is conventionally the case, and further, can eject the disk 12 from the unit relatively quickly.

Figure 16:
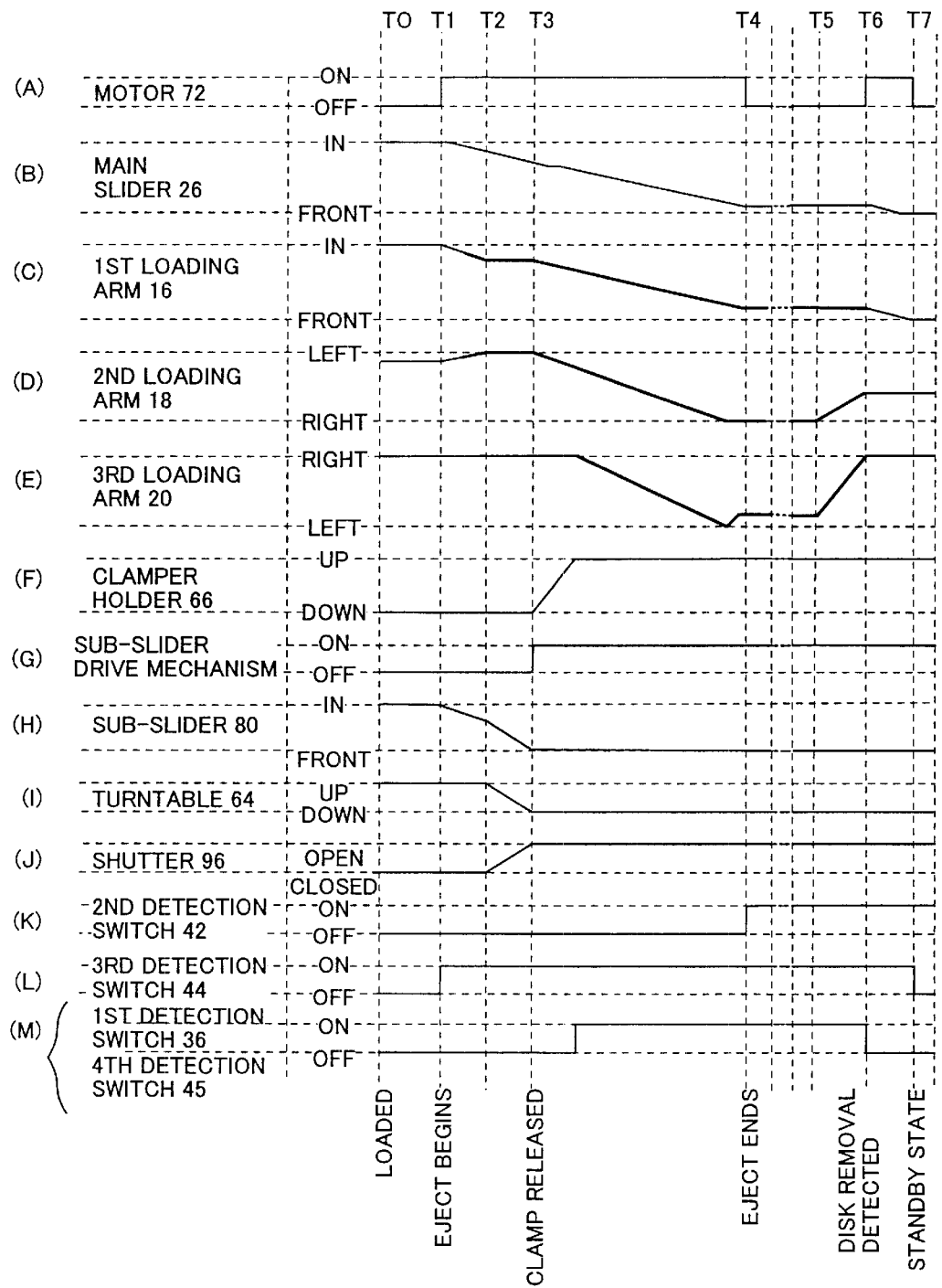
FIG. 16 is a timing chart showing the operational timing of various constituent parts of the disk unit according to the present invention, including the motor, main slider, arms, clamper holder, sub-slider drive mechanism (not otherwise indicated in the drawings), sub-slider, turntable, shutter, detection switches.

FIG. 16 is a timing chart showing the operational timing of various constituent parts of the disk unit according to the present invention, including the motor 74, main slider 26, arms 16, 18 and 20, clamper holder 66, sub-slider drive mechanism (not indicated in the drawings), sub-slider 80, turntable 64, shutter 96, detection switches 42, 44, 36 and 45.

It should be noted that with respect to (C) in FIG. 16, the thin line indicates that the roller 29 of the arm 16 is separated from the outer periphery of the disk 12 and the thick line indicates that the roller 29 of the arm 16 is contacting the outer periphery of the disk 12.

Also, it should be noted that with respect to (D) in FIG. 16, the thin line shows that the roller 30 of the arm 18 is separated from the outer periphery of the disk 12 and the thick line indicates that the roller 30 of the arm 18 is contacting the outer periphery of the disk 12. Additionally, the left position shows a state in which the roller 30 is at the left side (Yb side) when seen from the front and the right position shows a state in which the roller 30 is positioned at a right side (Ya side) when seen from the front.

With respect to (E) in FIG. 16, the thin line portion indicates that the roller 32 of the arm 20 is separated from the outer periphery of the disk 12, and that the thick line portion indicates that the roller 32 of the arm 20 is contacting the outer periphery of the disk 12. Additionally, the left position shows a state in which the roller 32 is positioned at a left side (Yb side) when seen from the front and the right position shows a state in which the roller 32 is positioned at a right side (Ya side) when seen from the front.

A description will now be given of each time T1 through T7 with reference to (A) through (M) of FIG. 16, as well as to FIGS. 17A, 17B and 17C. FIGS. 17A, 17B and 17C are diagrams of a structure and operation of a second loading arm 18, showing plan views of disassembled guide arm 18A and retention arm 18B, a disk loaded state, and an eject state, respectively.

(1) At time 0, a disk load condition is shown (see FIGS. 1A, 1B). At this time, the disk 12 is clamped by the turntable 64 and the damper 68 supported by the damper holder 66. Additionally, the rollers 29, 30 and 32 supported by the arms 16, 18 and 20 are separated from the outer periphery of the disk 12.

(2) At time T1, the motor 72 is driven in response to a pressing of the eject button (not shown in the diagram) and the eject operation begins. At this time, the third switch 44 turns on.

(3) In the interval from time T1 to time T2, the main slider 26 is driven by the motor 72 toward the front (Xa direction) from the position shown in FIG. 1A. At this time, the pin 16a of the arm 16 is engaging the cam groove 26a of the main slider 26, so the arm 16 rotates toward the front (Xa direction) and the roller 29 contacts the periphery of the disk 12. Additionally, pin 18a of the arm 18 is engaging the cam groove 26b of the main slider 26, so the arm 18 rotates in the Yb direction and the roller 30 contacts the periphery of the disk 12.

The drive force of the motor 72 moves the subslider 80 forward in the Xa direction. The turntable 64 is held in the disk clamp position because the sub-chassis 60 pins 60a, 60b are engaged at an upper position of the sub-slider 80 cam groove 82, 84. The pin 96a of the shutter 96 is engaged at an upper position of the cam groove 94, so the insertion slot 50 of the slit plate 52 is at the closed position (indicated by the dashed line in FIG. 6).

In other words, in the interval T1 to T2, the rollers 29 and 30 contact the periphery of the disk 12 in a state in which the disk 12 is clamped.

(4) In the interval from time T2 to time T3, the main slider 26 is driven further forward in the Xa direction by the drive force of the motor 72. At this time the pins 16a and 18a engage a straight-line portion extending in the Xa–Xb direction within the cam grooves 26a, 26b, and so the arms 16 and 18 do not move from the T2 position.

The sub-slider 80 is driven further forward in the Xa direction by the drive force of the motor 72. The turntable 64 descends to a disk clamp release position as the sub-chassis 60 pins 60a and 60b are engaged at a lower position of the sub-slider 80 cam groove 82, 84 (see FIGS. 2, 3). The pin 96a of the shutter 96 is engaged at a lower position of the cam groove 94, so the insertion slot 50 of the slit plate 52 moves to an open position (indicated by the solid line in FIG. 6).

(5) In the interval from time T3 to time T4, the main slider 26 is driven by the motor 72 (see FIGS. 9A, 9B).

In the first half of the movement from the time T3 to the time T4, the sub-slider drive mechanism (not shown in the drawing) connected to the main slider 26 and the sub-slider 80 separates from the gear unit 78. In other words, the drive force of the motor 72 is transmitted to the main slider 26, and the main slider 26 retracts the sub-slider 80 via the sub-slider drive mechanism.

Additionally, in the first half of the movement from the time T3 to the time T4, the angular cam 48 of the main slider 26 drives the pin 46 of the damper holder 66, so that the damper holder 66 moves to an upper position, that is, a clamp release position. In so doing, the damper 68 supported by the damper holder 66 is withdrawn above the disk 12.

At the same time, the arms 16, 18 and 20 rotate. The pin 16a of the arm 16 is driven by the cam groove 26a of the main slider 26 and the arm 16 moves forward while pushing the disk in an eject direction (Xa direction).

The pin 18Aa of the guide arm 18A is driven by the main slider 26 cam groove 26b, the arm 18 rotates in the counter-clockwise direction and the retention arm 18B second roller 32 is driven by the ejection of the disk 12 so that the retention arm 18B rotates in the counter-clockwise direction relative to the guide arm 18A (see FIG. 17C). In so doing, the arm 18 moves to a right position while supporting the disk 12 and, at that time, the retention arm 18B press portion 18Ba presses the fourth detection switch 45 and turns the fourth detection switch 45 on.

Then, the roller 35 provided at the tip of the arm 20 is driven by the ejection of the disk 12 so as to rotate while supporting the periphery of the disk 12. Further, when the arm 20 rotates in response to the ejection of the disk 12, the tip of the arm 20 presses the first detection switch 36 and the first detection switch 36 turns on.

That is, the disk 12 is ejected while being supported by the rollers 29, 30 and 35 of the arms 16, 18 and 20 as well as the disk guides 22, 23, and is pressed in the eject direction by the roller 29 and ejected.

(6) At time T4, the second detection switch 42 is pressed by the slanted portion 40a of the left edge of the cam plate 40 and turns on (see FIGS. 10A, 10B). Then, when the second detection switch 42 turns on, the eject operation completion is detected and the rotation of the motor 72 is halted.

Thereafter, the unit is in standby until the user manually extracts the disk 12 therefrom and monitors the states of the first detection switch 36 and the fourth detection switch 45.

(7) In the interval from time T5 to time T6, when the user extracts the disk 12, the arm 20 is urged in the counter-clockwise direction by the force of a spring not shown in the diagram and rotates to a right-side position (Ya direction). Additionally, the force of the coil spring 19 rotates the retention arm 18B clockwise with respect to the guide arm 18A (see FIG. 17C), causing the arm 18 to rotate to a left-side position (Yb direction) (see FIG. 10A).

(8) At time T6, the arm 20 moves to the right-side position and the arm 18 moves to the left. The tip of the arm 20 separates from the first detection switch 36 and the arm 18 separates from the fourth detection switch 45. In so doing, the first detection switch 36 turns off and the fourth detection switch 45 turns off, and the extraction of the disk 12 is detected.

(9) In the interval from time T6 to time T7, the main slider 26 is driven further forward in the Xa direction by the drive force of the motor 72. The arm 16 moves forward in the Xa direction because the pin 16a is driven by the main slider 26 cam groove 26a.

(10) At time T7, the main slider 26 cam plate 40 separates from the third detection switch 44 and the third detection switch 44 turns off. When the third detection switch 44 is turned off the completion of the movement of the unit to the standby state awaiting the insertion of the disk is detected and the rotation of the motor 72 is stopped.

It should be noted that, thereafter, when no disk 12 is inserted, pressing the eject button (not shown in the diagram) rotates the motor 72 in reverse and turns the third detection switch 44 from off to on, and further rotating the motor 72 in reverse closes the shutter 96 (indicated by the dashed line in FIG. 6).

When the third detection switch 44 is switched from on to off, the rotation of the motor 72 is stopped. At this time, the arms 16 and 18 move in the Xb direction and return from the disk insertion standby state to an initial state (a loading state, as shown for example in FIGS. 1A and 1B).

Additionally, the disk loading device of the present embodiment is limited to a disk having a diameter of 12 cm and cannot use a disk having a diameter of 8 cm, and accordingly is configured so that loading is not carried out whenever a disk having a diameter of 8 cm is inserted into the unit, a description of this configuration being given below.

Specifically, the third loading arm 20 that turns a first detection switch 36 on and off and the second loading arm 18 that turns the fourth detection switch 45 on and off are not rotatably driven at the same time whenever an 8-cm disk is inserted. Then, when an insertion of a disk is detected by the disk insertion detection mechanism not shown in the diagram, the first detection switch 36 and the fourth detection switch 45 are checked and loading is not carried out if one of or both the first detection switch 36 and the fourth detection switch 45 is off. If both the first and fourth detection switches 36 and 45 are turned on then loading is performed, because it is determined that the disk inserted is a 12-cm diameter disk.

In other words, the motor 72 is rotated in reverse and the third switch 44 is switched from off to on, and when the motor 72 is further rotated in reverse the arms 16 and 18 move in the Xb direction and the disk 12 is loaded (see FIGS. 1A and 1B), the third detection switch 44 is turned off and the rotation of the motor 72 is stopped.

It should be noted that the present invention has been consistently described with reference to a CD-ROM device. However, it should be noted that the present invention is not limited to such a device but can be used with a CD-R, CD-RW, DVD or magneto-optical disk drive unit.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 11-345507 filed on Dec. 3, 1999, and Japanese Priority Application No. 2000-324398, filed on Oct. 24, 2000, and Japanese Laid-Open Patent Application No. 2000-358388 filed on Nov. 24, 2000, the contents of which are hereby incorporated by reference.

What is claimed is:

1. A recording medium loading device comprising:
a slot into which a recording medium is inserted;
a retaining member that retains the recording medium inserted from the slot;
a moving member that moves the retaining member so as to retract the recording medium from the slot in a disk insert direction during insertion and expel the recording medium in a disk eject direction during ejection;
a drive mechanism that drives the moving member in the insert direction and the eject direction;
a manual drive member having a rack engageable with a gear of said drive mechanism so as to engage said rack with said gear of said drive mechanism while said rack moves by a pressing operation to drive the drive mechanism in the eject direction, wherein the manual drive member has a press portion pressed by a pin inserted from a hole provided on the recording medium loading device, and wherein the manual drive member further comprises an impelling member that impels the recording medium loading device toward a position prior to movement;
a first guide groove for guiding movement of the manual drive member when the press portion is pressed; and
a second guide groove for guiding movement of the manual drive member when the press portion is pressed and rotating the manual drive member by using an impelling force of the impelling member so as to separate the rack from the gear of the drive mechanism when pressure on the press portion is released.

2. A recording medium loading device comprising:
a slot into which a recording medium is inserted;
a retaining member that retains the recording medium inserted from the slot;
a moving member that moves the retaining member so as to retract the recording medium from the slot in a disk insert direction during insertion and expel the recording medium in a disk eject direction during ejection;
a drive mechanism that drives the moving member in the insert direction and the eject direction; and
a manual drive member having a rack engageable with a gear of said drive mechanism so as to engage said rack with said gear of said drive mechanism while said rack moves by a pressing operation to drive the drive mechanism in the eject direction
wherein the manual drive member has a press portion pressed by a pin inserted from a hole provided on the recording medium loading device, and wherein the drive mechanism comprises:
a motor;
a worm driven by the motor;
a worm wheel that engages the worm;
a first gear that drives the moving member and which is integrated into a single unit with a shaft that presses through the worm wheel;
a clutch plate having a hole that accommodates the shaft and which moves in a direction of the shaft with respect to the worm wheel so as to engage as well as separate from the worm wheel;
a second gear that engages the rack of the manual drive member; and
a pressing member interposed between the second gear and the clutch plate so as to press the clutch plate against an inner wall of the worm wheel,
the rack of the manual drive member transmitting a rotation of the motor to the first gear via the worm and the worm wheel and the clutch plate.

3. The recording medium loading device as claimed in claim 1, wherein the recording medium is in the form of a disk.

4. The recording medium loading device as claimed in claim 1, further comprising:
a turntable that clamps and rotates the inserted recording medium; and
a pick-up that reads information recorded in the recording medium rotated by the turntable.

5. A recording medium loading device as claimed in claim 1 wherein said hole is provided on a front surface of the recording medium loading device.

6. A recording medium loading device as claimed in claim 2 wherein the recording medium is in the form of a disk.

7. A recording medium loading device as claimed in claim 2 further comprising:
a turntable that clamps and rotates the inserted recording medium; and
a pick-up that reads information recorded in the recording medium rotated by the turntable.

8. A recording medium loading device as claimed in claim 2 wherein said hole is provided on a front surface of the recording medium loading device.

9. A recording medium loading device comprising:
a slot into which a recording medium is inserted;
a retaining member that retains the recording medium inserted from the slot;
a moving member that moves the retaining member so as to retract the recording medium and expel the recording medium from said slot during ejection;
a drive mechanism that drives the moving member in the insert direction and the eject direction; and
a manual drive member movable between a first position and a second position,
wherein said manual drive member engages with said drive mechanism when slidably moving from said first position to said second position so as to drive said drive mechanism in the eject direction, and wherein said manual drive member disengages from said drive mechanism when moving from said second position to said first position so as not to drive said drive mechanism.

10. The recording medium loading device as claimed in claim 9, further comprising an urging member which urges said manual drive member toward said first position such that said manual drive member moves from said second position to said first position in response to said urging member.

11. The recording medium loading device as claimed in claim 9, further comprising an urging member which urges said manual drive member so as to disengage said manual drive member from said drive mechanism, wherein said manual drive member disengages from said drive mechanism by a force exerted by said urging member when moving said manual drive member from said second position to said first position.

12. The recording medium loading device as claimed in claim 9 wherein the manual drive member has a press portion pressed by a pin inserted from a hole provided on the recording medium loading device.

13. The recording medium loading device as claimed in claim 9 comprising:
   a slot into which a recording medium is inserted;
   a retaining member that retains the recording medium inserted from the slot;
   a moving member that moves the retaining member so as to retract the recording medium from the slot in a disk insert direction during insertion and expel the recording medium in a disk eject direction during ejection;
   a drive mechanism that drives the moving member in the insert direction and the eject direction; and
   a manual drive member having a rack engageable with a gear of said drive mechanism so as to engage said rack with said gear of said drive mechanism while said rack moves by a pressing operation to drive the drive mechanism tin the eject direction, wherein the manual drive member has a press portion pressed by a pin inserted from a hole provided on the recording medium loading device, wherein the manual drive member further comprises an impelling member that impels the recording medium loading device toward a position prior to movement;
   a first guide groove for guiding movement of the manual drive member when the press portion is pressed;
   a second guide groove for guiding movement of the manual drive member when the press portion is pressed and rotating the manual drive member by using an impelling force of the impelling member so as to separate the rack from the gear of the drive mechanism when pressure on the press portion is released.

14. The recording medium loading device as claimed in claim 9 wherein the recording medium is in the form of a disk.

15. The recording medium loading device as claimed in claim 9 further comprising:
   a turntable that clamps and rotates the inserted recording medium; and
   a pick-up that reads information recorded in the recording medium rotated by the turntable.

* * * * *